United States Patent
Ning et al.

(10) Patent No.: US 10,360,770 B2
(45) Date of Patent: Jul. 23, 2019

(54) ORDER RE-CHECK SYSTEM

(71) Applicants: BEIJING JINGDONG SHANGKE INFORMATION TECHNOLOGY CO., LTD., Haidian District, Beijing (CN); BEIJING JINGDONG CENTURY TRADING CO., LTD., Beijing (CN)

(72) Inventors: Runsu Ning, Beijing (CN); Jingren Tang, Beijing (CN); Zanyuan Wang, Beijing (CN); Haifeng Han, Beijing (CN); Xuejing Cheng, Beijing (CN); Xu Yi, Beijing (CN); Zhen Cui, Beijing (CN); Jinxing Hu, Beijing (CN); Jian Dong, Beijing (CN); Dan Li, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 116 days.

(21) Appl. No.: 15/532,246

(22) PCT Filed: Nov. 3, 2015

(86) PCT No.: PCT/CN2015/093737
§ 371 (c)(1),
(2) Date: Jun. 1, 2017

(87) PCT Pub. No.: WO2016/086746
PCT Pub. Date: Jun. 9, 2016

(65) Prior Publication Data
US 2017/0270754 A1    Sep. 21, 2017

(30) Foreign Application Priority Data
Dec. 2, 2014 (CN) .......................... 2014 1 0722771

(51) Int. Cl.
*G06K 19/07* (2006.01)
*G07G 1/00* (2006.01)
(Continued)

(52) U.S. Cl.
CPC ......... *G07G 1/009* (2013.01); *G06K 19/0725* (2013.01); *G06Q 10/08* (2013.01); *G06Q 20/208* (2013.01); *H01H 9/161* (2013.01)

(58) Field of Classification Search
CPC .... G07G 1/009; G06K 19/0725; G06Q 10/08; G06Q 20/208; H01H 9/161
(Continued)

(56) References Cited

U.S. PATENT DOCUMENTS

2008/0156705 A1* 7/2008 Markman ................. B07C 5/34
                                                                 209/552
2011/0320320 A1* 12/2011 Dearlove ............... G06Q 10/08
                                                                 705/27.1
(Continued)

FOREIGN PATENT DOCUMENTS

CN    101976415 A    2/2011
CN    203108812 U    8/2013
(Continued)

OTHER PUBLICATIONS

International Search Report with English translation and Written Opinion for Application No. PCT/CN2015/093737 dated Feb. 1, 2016 (8 pages).

*Primary Examiner* — Daniel A Hess
(74) *Attorney, Agent, or Firm* — Michael Best & Friedrich LLP

(57) ABSTRACT

An order re-check system, comprising: electronic tags arranged on turnover boxes; RFID readers/writers arranged on goods allocations, when the turnover boxed are located on the goods allocations, RFID readers/writers acquiring
(Continued)

number information of the turnover boxes via the electronic tags; a first information binding module, used for binding the first number information and the second number information in a one to one manner; a second information binding module, used for binding the second number information and orders in a one to one manner; a commodity information acquisition module, used for acquiring commodity information; a commodity information processing module, used for determining an order for a commodity according to the commodity information, and determining the first number information corresponding to the commodity according to a binding relationship between the first number information and the orders; and control indication modules, used for instructing the corresponding goods allocations or turnover boxes.

9 Claims, 3 Drawing Sheets

(51) Int. Cl.
*G06Q 20/20* (2012.01)
*H01H 9/16* (2006.01)
*G06Q 10/08* (2012.01)

(58) Field of Classification Search
USPC .......................... 235/383; 198/602; 700/216
See application file for complete search history.

(56) References Cited

U.S. PATENT DOCUMENTS

2014/0262690 A1* 9/2014 Henderson ............. B60M 1/305
 198/602
2016/0031644 A1* 2/2016 Schubilske .......... B65G 1/1376
 700/216

FOREIGN PATENT DOCUMENTS

CN 203179047 U 9/2013
CN 104463655 A 3/2015

* cited by examiner

ORDER RE-CHECK SYSTEM

CROSS-REFERENCE TO RELATED APPLICATIONS

This application is a national stage filing under 35 U.S.C. 371 of International Application No. PCT/CN2015/093737 filed Nov. 3, 2015, which claims the foreign priority benefit of Chinese Patent Application No. 201410722771.1 filed Dec. 2, 2014, which are incorporated by reference herein in their entireties.

TECHNICAL FIELD

The invention relates to the technical field of mail sorting, and in particular to an order re-check system.

BACKGROUND ART

With the rise of e-commerce online shopping, the number of mail packages to be mailed is huge. Most of consumers will order multiple commodities in an online shopping process, and these commodities are contained in one order that is correspondingly generated. Thus, in a mail sorting process, there is a need to pack multiple commodities ordered by a buyer in one order into one package, which is then delivered by a deliveryman. A general processing flow is as follows: one collective order, which contains commodities corresponding to several orders, is generated, an order picker performs picking in accordance with the commodities in the collective order, at this time the number of the commodities is comparatively huge, and the commodities are transferred to a re-check area by a picking cart to be subjected to "order re-check". The object of the order re-check is to distinguish the commodities in accordance with the orders, i.e., placing multiple commodities contained in each of the orders together, and generally placing the multiple commodities of one order in a same turnover box for preparation for packing and delivery. The current order re-check processing manner is not high in a degree of automation, and serious in manpower consumption, for example, an operator uses a handheld infrared scanning gun to scan each of the commodities, and is required to look at a computer screen for every scan of a barcode of the commodity to find the turnover box corresponding to the order to place the commodity in. This mechanical operation is intensive in labor, is easy for a fatigue error, and is low in working efficiency.

SUMMARY OF THE INVENTION

In view of the above, the invention puts forward an order re-check system, which utilizes RFID technology to achieve automatic binding of turnover boxes to orders, and utilizes an indicator lamp to directly indicate the position of the turnover box, and the system has a high degree of automation.

An embodiment of the invention provides an order re-check system, comprising: a plurality of electronic tags each disposed on one turnover box; a plurality of RFID readers/writers each disposed on one goods allocation, first number information corresponding to the goods allocation being stored in each of the RFID readers/writers, when the turnover box is located on the goods allocation, the RFID reader/writer acquiring second number information of the turnover box through the electronic tag, and sending out the first number information and the second number information, wherein the first number information and the goods allocations are in a one-to-one corresponding relationship, and the second number information and the turnover boxes are in a one-to-one corresponding relationship; a first information binding module for receiving the first number information and the second number information, and binding the first number information and the second number information one to one; a second information binding module for binding the second number information and orders one to one in accordance with a binding relationship between the first number information and the second number information and a binding relationship between the first number information and the orders; a commodity information acquisition module for acquiring commodity information and sending out the commodity information; a commodity information processing module for receiving the commodity information, determining the order to which the commodity belongs in accordance with the commodity information, and determining the first number information corresponding to the commodity in accordance with the binding relationship between the first number information and the orders or determining the second number information corresponding to the commodity in accordance with a binding relationship between the second number information and the orders; and a plurality of control indication modules each disposed on one goods allocation for indicating the corresponding goods allocations or turnover boxes in accordance with the first number information or the second number information determined by the commodity information processing module, wherein the turnover boxes are used for accommodating all the commodities included in a single order during order re-check.

Preferably, the control indication module comprises at least one indicator lamp.

Preferably, the control indication module further comprises a button electrically connected with the at least one indicator lamp, and the indicator lamp goes out when the button is pressed down.

Preferably, the system further comprises a re-check confirmation module for confirming that the current commodity has been re-checked when any button is pressed down.

Preferably, the re-check confirmation module is further used to pop up a predetermined prompt box when all the commodities in the order are marked as ones that have been re-checked.

Preferably, the control indication modules further comprises a display screen electrically connected with the at least one indicator lamp, and the display screen displays a predetermined digit or pattern when the indicator lamp lights up.

Preferably, the commodity information acquisition module comprises a handheld scanning gun, and the commodity information is barcode information or two-dimensional code information of the commodity.

Preferably, the electronic tag is disposed at a bottom of the turnover box.

Preferably, the RFID reader/writer is disposed on a base of the goods allocation.

Preferably, the control indication module is disposed on a base side of the goods allocation.

The advantageous effects of the invention are as follows: the order re-check system of the embodiment of the invention automatically scans electronic tag information of the turnover boxes by using the RFID readers/writers, which eliminates a previous step of sequentially scanning the orders bound to the turnover boxes, and LED indicator lamps corresponding to the readers/writers directly indicate the turnover boxes in which the commodities should be placed, which eliminates a previous link that an operator is required to frequently look at a computer screen, which can improve a degree of automation of the system, greatly reduce the operator's manual mechanical operations, and achieve the object of improving efficiency and accuracy of the order re-check.

DETAILED DESCRIPTION

The technical solution of the invention is described in detail below by taking the figures and specific embodiments into consideration:

Firstly, RFID (Radio Frequency Identification) technology is briefly introduced, an RFID device is mainly composed of a reader and a responder, and generally an electronic tag is used as the responder, and an RFID reader/writer is used as the reader. RFID originates from radar technology, utilizes a radio frequency method to perform non-contact two-way data communication in the form of electromagnetic wave coupling, and identifies a target and acquires relevant information, which can be applied to road traffic automatic charge management, RFID financial cards, automatic control of product processing, access control management, library collection management, anti-counterfeiting technology, and so on.

Figure 1:
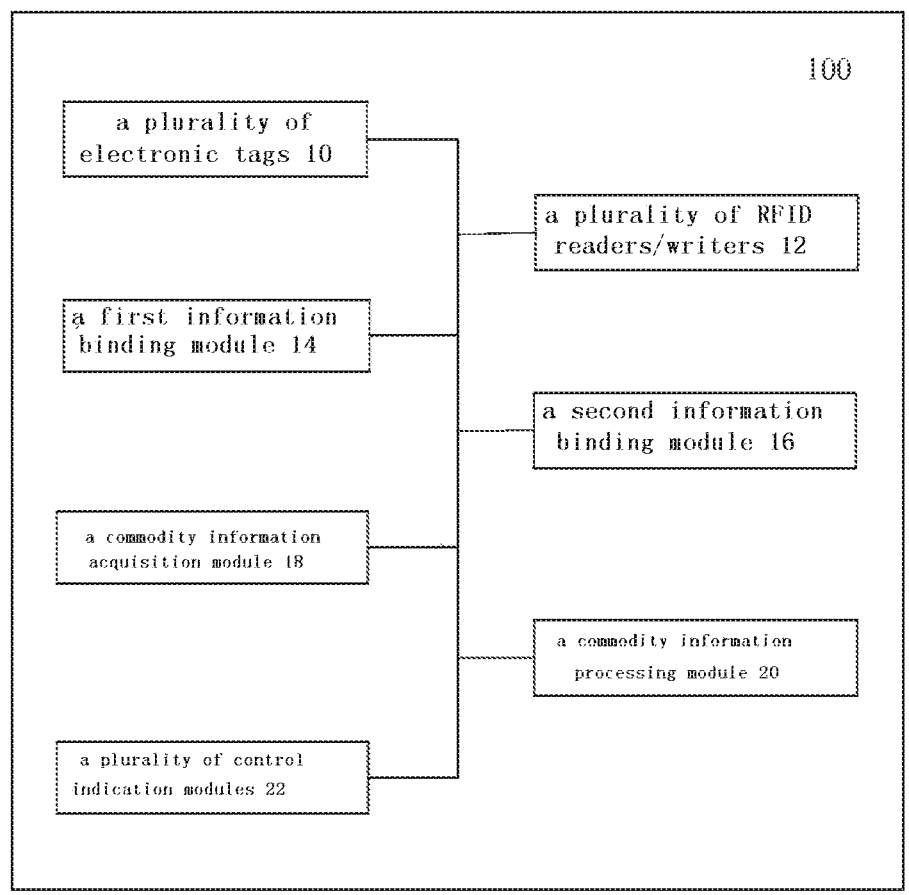
FIG. 1 is a block diagram of a structure of an order re-check system according to an embodiment of the invention.

FIG. 1 shows a block diagram of a structure of an order re-check system 100 according to an embodiment of the invention, comprising:
- a plurality of electronic tags 10 each disposed on one turnover box;
- a plurality of RFID readers/writers 12 each disposed on one goods allocation, first number information corresponding to the goods allocation being stored in each of the RFID readers/writers 12, when the turnover box is located on the goods allocation, the RFID reader/writer 12 acquiring second number information of the turnover box through the electronic tag 10, and sending out the first number information and the second number information, wherein the first number information and the goods allocations are in a one-to-one corresponding relationship, and the second number information and the turnover boxes are in a one-to-one corresponding relationship; a first information binding module 14 for receiving the first number information and the second number information, and binding the first number information and the second number information one to one;
- a second information binding module 16 for binding the second number information and orders one to one in accordance with a binding relationship between the first number information and the second number information and a binding relationship between the first number information and the orders;
- a commodity information acquisition module 18 for acquiring commodity information and sending out the commodity information;
- a commodity information processing module 20 for receiving the commodity information, determining the order to which the commodity belongs in accordance with the commodity information, and determining the first number information corresponding to the commodity in accordance with the binding relationship between the first number information and the orders or determining the second number information corresponding to the commodity in accordance with a binding relationship between the second number information and the orders; and
- a plurality of control indication modules 22 each disposed on one goods allocation for indicating the corresponding goods allocations or turnover boxes in accordance with the first number information or the second number information determined by the commodity information processing module.

Figure 2:
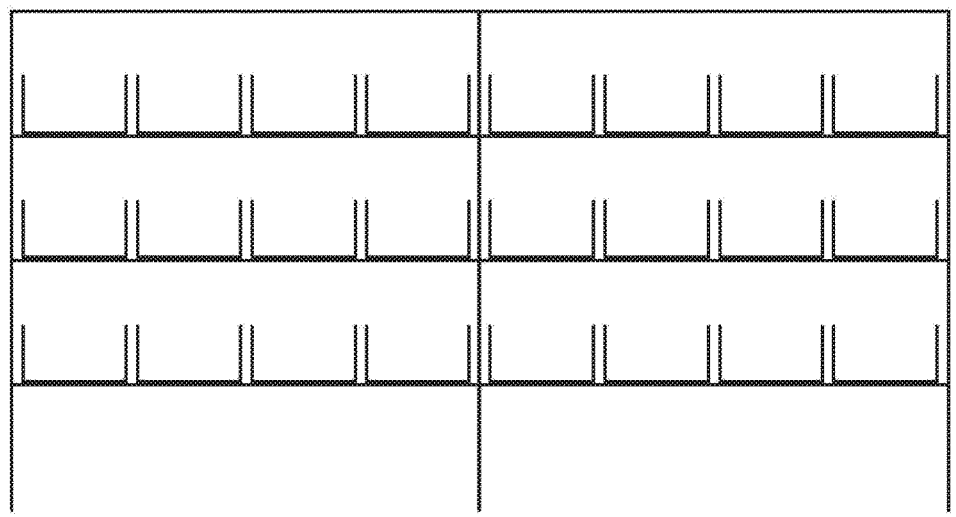
FIG. 2 is a schematic diagram of a structure a shelf according to an embodiment of the invention.
Figure 3:
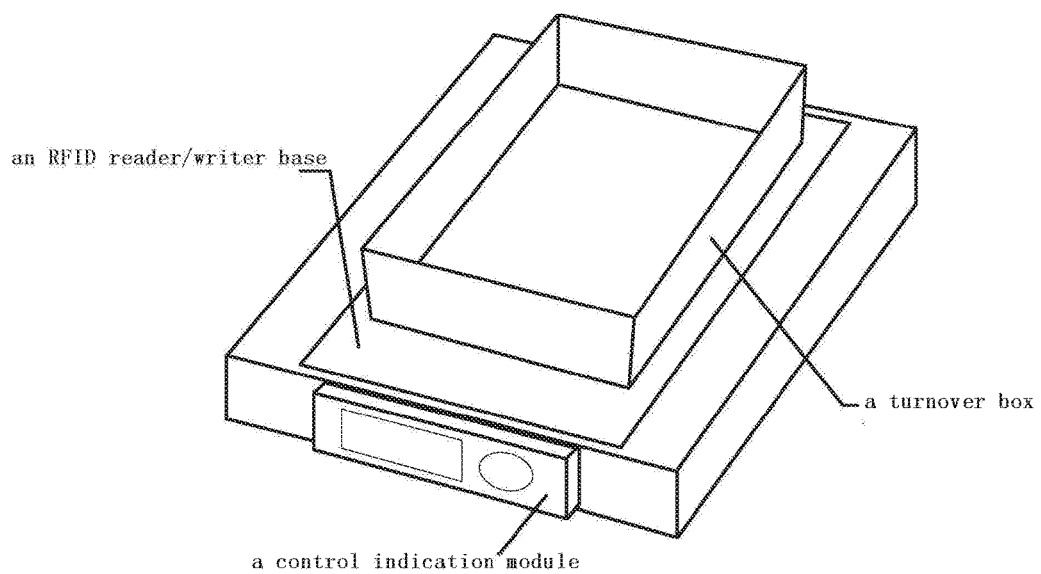
FIG. 3 is a schematic diagram of a state in which one turnover box is placed on a goods allocation in an embodiment of the invention.

In an actual application scenario, several orders and commodities arriving at a re-check area are re-checked using the order re-check system according to the embodiment of the invention. FIG. 2 shows a schematic diagram of a shelf used in an order re-check process according to an embodiment of the invention, wherein a plurality of goods allocations are disposed in one shelf, and one turnover box can be placed on one goods allocation, and FIG. 3 shows a state in which one turnover box is placed on a goods allocation. The shelf in FIG. 2 has three rows of goods allocations, each row contains eight goods allocations, and one turnover box is placed on each goods allocation. When the order is re-checked, all the commodities contained in one order are placed in one turnover box for preparation for a packing link after the order re-check.

In order to perform the order re-check, one electronic tag is provided for each turnover box, one RFID reader/writer is provided for each goods allocation (as shown in FIG. 3), and the electronic tag and the RFID reader/writer are used together. Firstly, when the operator puts the turnover box on the goods allocation, the RFID reader/writer will read information stored in the electronic tag, where the information stored in the electronic tag is the number information of the turnover box, for example, the format of the number of the turnover box can be set to one that starts with the letter T, followed by 6 digits, e.g., T005279, so as to distinguish different turnover boxes.

In some embodiments, the electronic tag can be disposed at the bottom of the turnover box, and the RFID reader/writer can be disposed on the base of the goods allocation without influencing mobile uses of the turnover box and the shelf. The RFID reader/writer obtains the number information (e.g., number T005279) of one turnover box from the corresponding electronic tag, and then sends the number information (e.g., number 05) of the pre-stored goods allocation together with the number information of the turnover box to a upper computer, and the upper computer can be configured to bind the number information of the goods allocation and the number information of the turnover box.

Each of the turnover boxes and each of the goods allocations on the shelf are subjected to the above processing, so each of the turnover boxes and each of the goods allocations are bound one to one. In addition, before a start of an order re-check flow or in the order re-check process, the operator enters the information of the order to be re-checked into the upper computer, and the upper computer can be configured to bind each order to one goods allocation. Then, the binding of the turnover box to the order can be performed in accordance with a binding relationship between the turnover box and the goods allocation and a binding relationship between the orders and the goods allocation. By the above processing, the bindings of multiple groups of orders, goods allocations and turnover boxes are completed.

Next, the operator adopts a handheld infrared scanning gun to scan the commodity in the re-check area, obtain barcode information of the commodity, and send it to the upper computer, and the upper computer can be configured to determine the order to which the commodity belongs from the barcode information of the commodity, and further to obtain the number of the turnover box or the number of the goods allocation corresponding to the order in accordance with the previously obtained binding relationship. In some embodiments, the two-dimensional code of the commodity can be also scanned to obtain specific information of the commodity.

Then, the upper computer issues an instruction to instruct the control indication module corresponding to the number of the turnover box or the number of the goods allocation to issue an instruction, for example, instructing an LED lamp disposed on the goods allocation to light up to prompt the operator to place the commodity scanned this time in the corresponding turnover box, in the embodiment of FIG. 3, the control indication module is disposed on the base side of the goods allocation.

Finally, as for the control instruction module, further, in addition to the LED lamp, a button and a display screen can be further disposed, and triggering and recovery of the three parts are controlled by a chip microcomputer. During work, the control indication module faces towards the direction of the operator, so the operator can intuitively see the light-up of the LED lamp after scanning the commodity, the operator presses down the corresponding button after placing the commodity in the turnover box indicated by the LED lamp, so on the one hand, the LED lamp goes out, and on the other hand, this action can be reported to the upper computer, and the upper computer is configured to confirm that the corresponding commodity has been re-checked, e.g., the commodity that has been just scanned can be marked as a "re-checked" one, after receiving the information that one button of the control indication module is pressed down; and after all the commodities in the order have been re-checked, a prompt box can be popped up to prompt the operator that re-checking work of this batch of orders is completed.

In some embodiments, it can be also set that while the LED lamp lights up, a corresponding digit or pattern is displayed on the display screen, e.g., the number of the goods allocation, the number of the turnover box or a specific pattern can be displayed, and when the LED lamp goes out, the display screen also becomes dark.

Figure 4:
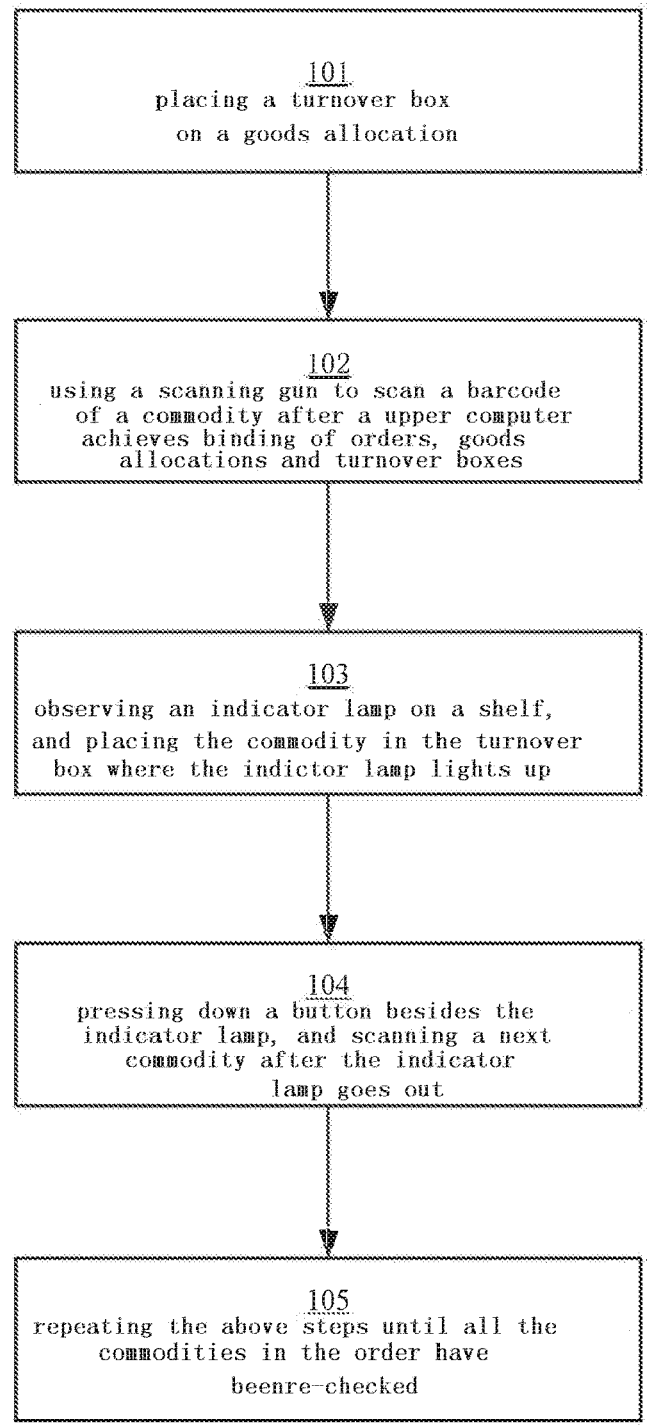
FIG. 4 is a block diagram of an order re-check operation process based on the order re-check system according to the embodiment of the invention.

FIG. 4 shows an operation process based on the order re-check system according to the embodiment of the invention. The operator is only required to place a certain number of turnover boxes on the respective goods allocations on the shelf, and the order re-check system can automatically return the number of the turnover box and the number of the goods allocation and bind the two numbers, and then achieve binding of three parts, i.e., the order, the turnover box and the goods allocation, in accordance with the existing binding relationship between the order and the number of the goods allocation; then after the operator uses the scanning gun to scan the barcode or two-dimensional code of the commodity, the indicator lamp of the corresponding turnover box or goods allocation automatically lights up, it is only required to place the commodity in so as to complete the re-check of the commodity, during which it is not required to further observe and confirm the number of the turnover box by the display screen of the upper computer, and it is not required to seek for the turnover box among a larger number of turnover boxes on the shelf either; which greatly reduce action steps of the operator and improve the degree of automation of the system, and the entire re-check process is smoother and accuracy of the re-check is high.

In addition, it should be noted that it can be seen by the descriptions of the above embodiments that in a case that only the binding of the orders and the goods allocations one to one is achieved, the corresponding LED lamp mounted on the side of the goods allocation can be also lighted up after code scanning of the commodity, but the binding of the three parts, i.e., the order, the turnover box and the goods allocation, is prescribed in the embodiments of the invention for the reason of the preparation for the packing link after the re-check of the order, i.e., after the completion of the re-check of the order, the operator is required to transfer all the turnover boxes to a packing area to be processed, and at this time, a binding relationship between the orders and the turnover boxes is indispensable. As can be seen, an optimized design of the order re-check in the embodiments of the invention will not influence the other subsequent links.

The technical solution of the invention is introduced in detail above by taking specific embodiments into consideration, and the described specific embodiments are used to help understanding of the concept of the invention. Inferences and variations made by those skilled in the art on the basis of the specific embodiments of the invention also belong to the scope of protection of the invention.

The invention claimed is:

1. An order re-check system, comprising:
   a plurality of electronic tags, each of the plurality of electronic tags is disposed on one turnover box;
   a plurality of RFID readers/writers, each of the plurality of RFID readers/writers is disposed on a respective goods allocation, first number information corresponding to the goods allocation being stored in each of the RFID readers/writers, when one turnover box is located at one goods allocation, the RFID reader/writer associated with the goods allocation acquiring second number information of the turnover box through the electronic tag, and sending out the first number information and the second number information, wherein the first number information and the goods allocations are in a one-to-one corresponding relationship, and the second number information and the turnover boxes are in a one-to-one corresponding relationship;
   a first information binding module configured to receive the first number information and the second number information, and bind the first number information and the second number information one to one;
   a second information binding module configured to bind the second number information and orders one to one in accordance with a binding relationship between the first number information and the second number information and a binding relationship between the first number information and the orders;
   a commodity information acquisition module configured to acquire commodity information associated with a commodity and send out the commodity information;
   a commodity information processing module configured to receive the commodity information, determine the order to which the commodity belongs in accordance with the commodity information, and determine the first number information corresponding to the commodity in accordance with the binding relationship between the first number information and the orders or determine the second number information corresponding to the commodity in accordance with a binding relationship between the second number information and the orders; and a plurality of control indication modules each disposed at a respective goods allocation, and configured to indicate the corresponding goods allocations or turnover boxes in accordance with the first number information or the second number information determined by the commodity information processing module, wherein the turnover boxes are used for accommodating all the commodities included in a single order when the order is re-checked, wherein each of the plurality of control indication modules includes a button and wherein the order re-check system further includes a re-check confirmation module configured to confirm that a current commodity has been re-checked when said button is pressed down.

2. The order re-check system according to claim 1, wherein the control indication module comprises at least one indicator lamp.

3. The order re-check system according to claim 2, wherein button is electrically connected with the at least one indicator lamp, and the indicator lamp goes out when the button is pressed down.

4. The order re-check system according to claim 2, wherein the control indication modules further comprises a display screen electrically connected with the at least one indicator lamp, and the display screen displays a predetermined digit or pattern when the indicator lamp lights up.

5. The order re-check system according to claim 1, wherein the re-check confirmation module is further configured to pop up a predetermined prompt box when all the commodities in the order are marked as ones that have been re-checked.

6. The order re-check system according to claim 1, wherein the commodity information acquisition module comprises a handheld scanning gun, and the commodity information is barcode information or two-dimensional code information of the commodity.

7. The order re-check system according to claim 1, wherein each of the electronic tags is disposed at a bottom of a respective turnover box.

8. The order re-check system according to claim 1, wherein each of the RFID readers/writers is disposed on a base of a respective goods allocation.

9. The order re-check system according to claim 1, wherein each of the control indication modules is disposed on a base side of a respective goods allocation.

* * * * *